United States Patent [19]
Lapin et al.

[11] Patent Number: 5,139,872
[45] Date of Patent: Aug. 18, 1992

[54] VINYL ETHER BASED OPTICAL FIBER COATINGS

[75] Inventors: Stephen C. Lapin, Wauconda, Ill.; Alvin C. Levy, Atlanta, Ga.

[73] Assignee: Allied-Signal Inc., Morris Township, Morris County, N.J.

[21] Appl. No.: 574,705

[22] Filed: Aug. 29, 1990

[51] Int. Cl.⁵ .................. C08L 35/08; G02B 6/16
[52] U.S. Cl. .................. 428/375; 385/123; 385/128; 385/141; 428/378; 522/90; 522/96; 522/97; 522/181; 525/455; 526/301; 526/320; 528/49
[58] Field of Search .......... 428/375, 378; 385/128, 385/141, 123; 522/90, 96, 97, 111, 181; 525/79, 80, 455; 526/301, 319, 320, 329.6, 332; 528/49, 361, 363; 560/25, 115, 158

[56] References Cited

U.S. PATENT DOCUMENTS

| | | | |
|---|---|---|---|
| Re. 33,211 | 5/1990 | Lapin et al. | 525/455 |
| 4,254,230 | 3/1981 | Howard | 525/28 |
| 4,472,019 | 9/1984 | Bishop et al. | 385/128 |
| 4,682,851 | 7/1987 | Ansel | 385/141 |
| 4,690,501 | 9/1987 | Zimmerman et al. | 350/96.29 |
| 4,775,732 | 10/1988 | Lapin | 528/49 |
| 4,806,574 | 2/1989 | Krajewski et al. | 522/96 |
| 4,902,727 | 2/1990 | Aoki et al. | 522/90 |
| 4,908,297 | 3/1990 | Head et al. | 430/284 |
| 4,932,750 | 6/1990 | Ansel et al. | 350/96.34 |
| 4,971,424 | 11/1990 | Babirad et al. | 350/96.34 |
| 5,019,636 | 5/1991 | Lapin et al. | 526/301 |
| 5,045,572 | 9/1991 | Plotkin et al. | 522/31 |

*Primary Examiner*—George F. Lesmes
*Assistant Examiner*—Christopher Brown
*Attorney, Agent, or Firm*—Harold N. Wells; Roger H. Criss; Mary Jo Boldingh

[57] ABSTRACT

Optical fiber coatings may be prepared from compositions containing a vinyl ether oligomer prepared by reacting an hydroxyl-terminated polyester or polyether, a diisocyanate, and a hydroxy monovinyl ether, with mono or multifunctional vinyl ether terminated monomers, which may be derived from esters or alcohols.

15 Claims, No Drawings

VINYL ETHER BASED OPTICAL FIBER COATINGS

PRIOR ART

This invention relates generally to the field of optical fibers and, more particularly, to the coatings applied to such fibers and the coated fibers.

Optical fibers have become commonplace in recent years because of their ability to handle large volumes of data transmitted over long distances. However, this is only possible because optical fibers have been developed which have extremely low transmission losses. These optical fibers are operated with light having wavelengths in the narrow regime between 0.6 and 1.6 microns to obtain the maximum transmission of light. Losses have been attributed to scattering of light, absorption, and imperfections called "microbending", which refers to scattering of light caused by small deformations of the fiber axis. Such microbending has been attributed to coating defects, thermal contraction and external stresses. It has been found desirable to coat glass fibers in order to protect them and to give strength to the fibers and to alleviate the losses assigned to microbending.

Properties of the coatings depend on the type used, but where two layers are employed, as is typical in the art, the inner layer should have a low modulus down to $-40°$ C., be thermally and hydrolytically stable, have good adhesion to glass and not evolve hydrogen (which can react with the fiber and reduce light transmission). The outer of a two layer system serves to protect the fiber and the inner coating and thus must meet different requirements. The outer layer should be tough and abrasion resistant, be thermally and hydrolytically stable and not evolve hydrogen.

In practice, the most commonly used coatings have been derived from acrylates, although silicones or rubber compounds have been employed. The most widely used acrylates are those which are capable of ultra-violet radiation curing at high speed since the coatings are normally applied immediately after the glass fiber has been drawn from the molten state. Typical of such acrylates are multifunctional acrylate terminated monomers and oligomers. The outer coating are most often urethane-acrylate or epoxy-acrylate copolymers which also can be cured by ultra-violet radiation. The acrylates have inherent disadvantages since they are considered to present health hazards and also tend to be brittle and to absorb moisture.

In U.S. Pat. No. 4,472,019 a top coating is disclosed for fiber optic filaments. The coating is composed of three parts. First is a diethylenically-terminated polyurethane, which could be a vinyl ether-terminated polyurethane such as formed by reaction with a hydroxybutyl vinyl ether. The second part is a diethylenically unsaturated ester of a diglycidal ether of a bisphenol, which also could be a vinyl ether terminated compound. The third part is a monoethylenically unsaturated monomer such as N-vinyl pyrrolidone. Thus, although an acrylate termination is preferred, the patentees do suggest that vinyl ether terminations could be used. However, acrylates and vinyl ethers provide polymers having different properties and one skilled in the art would not conclude from this disclosure that vinyl ether terminated compounds, when properly selected could provide advantages over acrylate-terminated compounds and could be substituted to provide superior properties.

In U.S. Pat. No. 4,682,851 an undercoating is described which is different from the outer coating of U.S. Pat. No. 4,472,019, but is assigned to the same owner. The coating is to be both soft and tough and, consequently, has a different composition from that of the outer coating. The coating composition has three components—first, an oligomer which may be a polyalkylene polyether combined with an isocyanate and terminated with an ethylenically unsaturated group, which may be vinylic. The second component is a monoethylenically unsaturated monomer having a Tg below 10° C. which may be vinylic. The third component is a monoethylenically unsaturated monomer which has a strong capacity for hydrogen bonding and which does not include vinylic unsaturation. In general, although vinylic unsaturation is mentioned, it is clear that acrylic terminations are preferred. This composition is distinguished from the present invention by the use of the third component having no vinyl unsaturation, but one skilled in the art finds nothing more than a suggestion that vinyl ethers could provide an undercoating for optical fibers; in fact, if one would be directed toward acrylic terminations and would expect that vinyl terminations would be inferior.

The present inventors have found that vinyl ether based polymers can be formulated to provide superior coatings for glass optical fibers, having higher cure speed, improved low temperature properties, improved moisture resistance, and lower toxicity compared to the acrylates heretofore used. As will be seen in the following discussion, coatings can be prepared which are capable of serving the requirements of both the inner and the outer layers, while being quite similar in nominal composition.

SUMMARY OF THE INVENTION

Fiber optic coatings may be prepared from compositions which employ the vinyl ether urethane oligomers of co-pending U.S. patent application Ser. No. 07/350,068, now U.S. Pat. No. 5,019,636, along with mono or multi-functional vinyl ether terminated monomers, which may be derived from esters or alcohols. The coating compositions include an effective amount of a photoinitiator to cause the vinyl ethers to react and produce the desired coatings.

The vinyl ether urethane oligomer is obtained by reacting (i) an hydroxyl-terminated polyester having the formula

where
X and Y are divalent radicals having a molecular weight of 28 to about 500 and selected from the group consisting of alkylene, arylene, aralkylene, and cycloalkylene radicals
m has an average value of 1 to about 100
and (ii) a diisocyanate having the formula

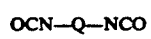

where

Q is a divalent radical selected from the group consisting of alkylene, arylene, aralkylene, and cycloalkylene radicals
or a polyisocyanate having a functionality of 2 or more
and (iii) a hydroxy monovinyl ether having the formula

$$R_1CH=CR_2O-Z-OH$$

where
$R_1$ and $R_2$ are mono valent radicals selected from the group consisting of H and alkyl groups having 1–10 carbon atoms
Z is a divalent radical having a molecular weight of 28 to about 500 and selected from the group consisting of alkylene or cycloalkylene radicals.

The vinyl ether urethane oligomers are combined with a vinyl ether terminated ester monomer having the formula

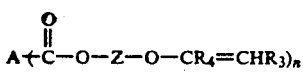

$$A+C-O-Z-O-CR_4=CHR_3)_n$$

where
n is 1 to 4,
A is a mono, di, tri, or tetra functional radical having a molecular weight of 15 to 180 and selected from the group consisting of alkylene, arylene, aralkylene and cycloalkylene radicals,
Z is a divalent radical having a molecular weight of 25 to 500 and selected from the group consisting of alkylene or cycloalkylene radicals,
$R_3$ and $R_4$ are monovalent radicals selected from the group consisting of H and alkyl groups having 1–10 carbon atoms.

The formulation also comprises a vinyl ether terminated monomer derived from an alcohol having the formula

$$D-(O-CR_6=CHR_5)_{n'}$$

where
n' is 1 to 4
$R_5$ and $R_6$ are monovalent radicals selected from the group consisting of H and alkyl groups having 1–10 carbon atoms and
D is a mono, di, tri, or tetrafunctional radical having a molecular weight of 56 to 1,000 and selected from the group consisting of alkylene, cycloalkylene, or alkylene ethers.

In an alternative embodiment the vinyl ether urethane oligomer may be one in which the polyester of (i) is replaced entirely or in part by a hydroxy-terminated polyether having the general formula

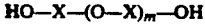

$$HO-X-(O-X)_m-OH$$

where m and X are as defined for the polyester of (i).

A primary (inner) coating for optical fibers comprises 50–85 weight percent of the vinyl ether urethane oligomer, up to 50 weight percent of vinyl ether terminated ester monomers, and up to 50 weight percent of vinyl ether terminated monomers derived from an alcohol, the total for the two types of monomers being no more than 50%, along with 0.1 to 5 weight percent of a cationic photoinitiator and optionally up to about 3% by weight of a thermal oxidation stabilizer, based on the total composition. While the ester or alcohol derived monomers may be either mono or multifunctional in the vinyl ether termination, it is preferred that one of the monomers be mono-functional.

A secondary (outer) coating for optical fibers comprises 30–70 weight percent of the vinyl ether urethane oligomer, up to 70 weight percent of vinyl ether terminated ester monomers, and up to 70 weight percent of vinyl ether terminated monomers derived from an alcohol, the total for the two types of monomers being no more than 70%, along with 0.1 to 5 weight percent of a cationic photoinitiator and optionally, up to about 3 weight percent of a thermal oxidation stabilizer.

DESCRIPTION OF PREFERRED EMBODIMENTS

Coatings for optical fibers may be produced by combining the vinyl ether urethane oligomers of co-pending U.S. patent application Ser. No. 07/350,068, now U.S. Pat. No. 5,019,636, incorporated herein by reference, with related monomers. The compounds which are reacted to form the coating precursors are discussed below.

Vinyl Ether Urethane Oligomers

These oligomers are prepared by reacting (i) a hydroxyl terminated polyester or polyether (ii) a diisocyanate and (iii) a hydroxy monovinyl ether.

Polyesters/Polyethers

The polyesters are hydroxyl-terminated and may be generally defined by the formula

$$HO-X+O-C-Y-C-O-X)_m-OH$$

where
X and Y are divalent radicals having a molecular weight of 28 to about 500 and selected from the group consisting of alkylene, arylene, aralkylene and cycloalkylene radicals
m has an average value of 1 to about 100

The moieties X and Y may be alkylene groups, especially those containing up to about 20 carbon atoms, a cycloalkylene group, an arylene, or aralkylene group. Examples of the alkylene moieties which may be used include methylene, ethylene, propylene, butylene, pentylene, hexylene, heptylene, octylene, nonylene, decylene, undecylene, dodecylene, tridecylene, tetradecylene, pentadecylene, hexadecylene, heptadecylene, octadecylene, nonadecylene, and eicosylene. Examples of arylene groups include phenylene, naphthylene, anthrylene, phenanthrylene, etc. Cycloalkylene groups include the cyclopentylene, cyclohexylene, cycloheptylene, cyclooctylene, and cycloalkylene groups containing 1 or more alkyl groups on the nucleus. Similarly, the arylene groups which may be used for Y also may contain one or more alkyl groups on the aromatic ring, especially where such alkyl groups contain up to about 6 carbon atoms. Examples of aralkylene groups include benzylene, 1-phenethylene, 2-phenethylene, 3-phenylpropylene, 2-phenylpropylene, 1-phenylpropylene, etc. Particularly useful Y groups are —$(CH_2)_n$— groups where n is 2, 3, or 4; 1,2, 1,3, or 1,4 phenylene groups; and 1,4 cyclohexylene groups. Particularly useful X groups are —$CH_2CH_2$—; —$CH_2CH_2$—O—$CH_2CH_2$—; —$CH_2$—$(CH_3)CH$—; —$(CH_2)_n$— where n is 4 or 6; —$CH_2$—$(CH_3)_2C$—$CH_2$—; 1,4 phenylene; and 1,4-bis(-methyl)phenylene.

m will be an integer from 1 to about 100, preferably from 1 to 10.

Particularly preferred hydroxyl-terminated polyesters include poly(propylene adipate), poly(neopentyl adipate), poly(1,4-butane adipate), poly(1,6-hexane adipate), poly(neopentyl isophthalate), and poly(1,6-hexane isophthalate). Polyesters derived from mixed diols or acids may be useful. The preferred molecular weights for the polyesters will be about 500 to 5000.

In an alternative embodiment the polyester component of the vinyl ether urethane oligomer may be replaced in whole or in part by a polyether having the formula HO—X—(O—X—)$_m$—OH where X and m are as defined above in connection with the polyesters.

Where such polyethers are used, X preferably will be —CH$_2$CH$_2$—, —CH$_2$(CH$_3$)CH—, and —CH$_2$CH$_2$CH$_2$CH$_2$—.

Diisocyanates

The diisocyanates may be generically described by the formula, OCN—Q—NCO where Q is a divalent radical selected from the group consisting of alkylene, arylene, aralkylene, and cycloalkylene radicals.

A broad variety of diisocyanates may be used and may be exemplified by such materials as the toluene diisocyanates (TDI), p- and m-phenylene diisocyanate, 1,4-tetramethylene diisocyanate, 1,6-hexamethylene diisocyanate, 2,2,4-trimethylhexamethylene diisocyanate, 1,4-cyclohexane diisocyanate, 4,4'-dicyclohexylmethane diisocyanate (Desmodur W), 4,4'-diphenylmethane diisocyanate (MDI), 3,3'-dimethyl-4,4-diphenylmethane diisocyanate, 1,5-tetrahydronaphthalene, diisocyanate, naphthalene-1,5'-diisocyanate, bis(2-methyl-3-isocyanatephenyl)methane, 4,4'-diphenylpropane diisocyanate, tetramethylxylene diisocyanate (TMXDI), isophorone diisocyanate (IPDI).

Polyisocyanates with a functionality of 2 or more such as are described and discussed in U.S. Pat. No. 4,433,067, especially the polyisocyanates based on methylenediphenyl diisocyanate, especially the 4,4'-isomer and the uretonimine modified MDI as described there, also may be utilized. The term polyisocyanate also includes quasi prepolymers of polyisocyanates with active hydrogen containing materials where the polyisocyanate is typically reacted with from about 0.05 to about 0.3 equivalents of a polyol. Although a vast number of polyisocyanates are suitable, in practice polyisocyanates based on MDI and TDI may be preferred for economy and general availability. However, aliphatic isocyanates exhibit non-yellowing properties which are especially important for coatings.

Among the most desirable isocyanates may be mentioned 4,4'-diphenylmethane diisocyanate, toluene diisocyanate, isophorone diisocyanate, m-tetramethylxylene diisocyanate, 4,4'-dicyclohexylmethane diisocyanate (Desmodur W), and 1,6-hexamethylene diisocyanate.

Hydroxy Monovinyl Ethers

The vinyl ether terminated alcohols which are used in preparing the oligomeric esters have a structure corresponding to the adduct of an alkyne and a diol. However, these vinyl ether terminated alcohols also can be made in other ways, and the method of producing them is not part of this invention. The alkyne has the generic formula R$_1$C≡CR$_2$, and the diol has the generic formula HO—Z—OH. The generic formula of the vinyl ether terminated alcohols of our invention is

R$_1$CH=CR$_2$O—ZOH.

The groups R$_1$ and R$_2$ are independently selected from the group consisting of hydrogen and lower alkyl moieties containing from 1 to 10 carbon atoms, although those with from 1 to about 4 carbon atoms are favored. It is preferable that both R$_1$ and R$_2$ are not alkyl moieties, for in the case where both are lower alkyl groups this causes an undesirable reduction in polymerization rate of the oligomers of our invention. Where R$_1$ is an alkyl moiety it is preferred that R$_2$ be hydrogen, and conversely; where R$_1$ is hydrogen then R$_2$ should be an alkyl of 1 to 4 carbons. In a preferred embodiment R$_1$ or R$_2$ is a methyl group and R$_2$ and R$_1$ is hydrogen. In a still more preferred embodiment both R$_1$ and R$_2$ are hydrogen.

Z will be a divalent radical having a molecular weight of 28 to about 500 and selected from the group consisting of alkylene or cycloalkylene radicals.

Among the diols one important class consists of alkylene glycols, HO(C$_n$H$_{2n}$)OH, where n is an integer from 2 to about 10. The linear alkylene glycols, HO(CH$_2$)$_n$OH, (polymethylenediols), where n is an integer from 2 to about 10, are particularly useful, especially where n is from 2 to about 6. Illustrative of the members of this group are such diols as ethylene glycol, 1,3-propylene glycol, 1,4-butanediol, 1,5-pentanediol, 1,6-hexanediol, 1,7-heptanediol, 1,8-octanediol, 1,9-nonanediol, and 1,10-decanediol (decamethylene glycol).

The nonlinear or branched alkylene diols also may be used, where such glycols contain from 3 up to about 10 carbon atoms. Examples include 1,2-propylene glycol, 2,3-butanediol, 2,3-dimethyl-2-3-butanediol, 2,3-dimethyl-1,4-butanediol, 2,2-dimethyl-1,3-propanediol(-neopentylglycol).

Another useful class of diols are the polyalkylene glycols, especially poly(ethylene) glycols, HO-[—CH$_2$CH$_2$O—]$_m$OH, and poly(propylene) glycol, HO[—CH(CH$_3$)CH$_2$O—]$_m$OH, where m is an integer from 1 up through about 50, although more usually m is an integer from 1 up to about 10, and most preferably from 1 up to about 5. Examples of these glycols include diethylene glycol, triethylene glycol, tetraethylene glycol, pentaethylene glycol, hexaethylene glycol, etc., along with the analogs of the propylene glycols.

Of particular importance is the case where Z is a divalent radical whose parent is a cycloalkane, such as cyclopentane, cyclohexane, cycloheptane, or cyclooctane, preferably the bishydroxy alkyl derivatives. The preferred diols are the 1,3-bis(hydroxyalkyl)cyclopentanes and the 1,4-bis(hydroxyalkyl)cyclohexanes, -cycloheptanes, and -cyclooctanes, particularly the cyclohexanes. Diols substituted at positions different from those specified above may be used in the practice of this invention, but not necessarily with equivalent results. The bis(hydroxymethyl)cyclohexanes are preferred as they are readily available from the reduction of the corresponding phthalic acids, and among these 1,4-bis(-hydroxymethyl)cyclohexane is favored.

Of the hydroxy monovinyl ethers which are produced by the reaction of acetylene with the diols described above, those which are especially preferred include 4-hydroxybutyl vinyl ether (HBVE), 4-hydroxymethyl cyclohexylmethyl vinyl ether (CHMVE), 2-hydroxy ethyl vinyl ether, triethylene glycol monovinyl ether, and diethylene glycol monovinyl ether.

Particularly preferred embodiments of the vinyl ether terminated urethane oligomers include those where the components are defined as follows.

X is a divalent radical selected from the group consisting of

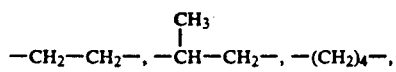

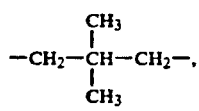

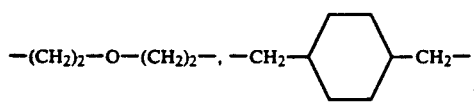

Y is a divalent radical selected from the group consisting of

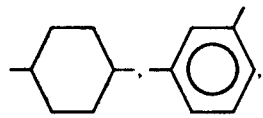

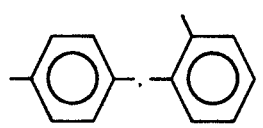

Q is a divalent radical selected from the group consisting of

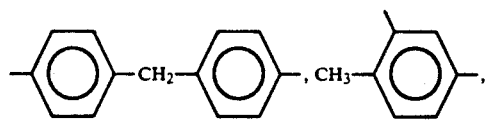

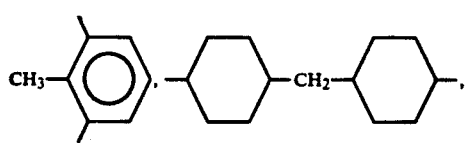

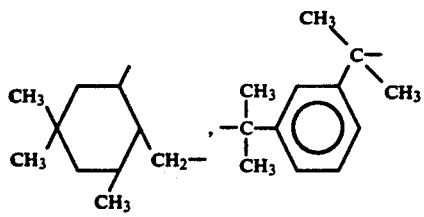

$R_1$ and $R_2$ are monovalent radicals selected from the group consisting of —H and —CH$_3$, and Z is a divalent radical selected from the group consisting of

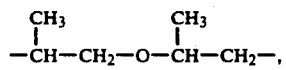

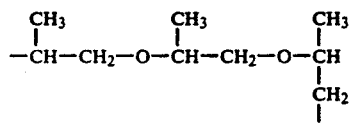

—(CH$_2$)$_4$—, —(CH$_2$)$_4$—O—(CH$_2$)$_4$—,

—(CH$_2$)$_4$—O—(CH$_2$)$_4$—O—(CH$_2$)$_4$—,

—(CH$_2$)$_2$—O—(CH$_2$)$_2$—O—(CH$_2$)$_2$—,

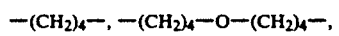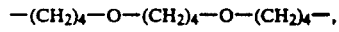

Reaction Conditions

An important characteristic of the vinyl ether terminated urethane oligomers is that in all cases there are few hydroxyl groups derived from the polyester or hydroxy monovinyl ether in the final product. That is, less than about 10% of the initial hydroxyl groups remain unreacted. It is most preferable that the oligomeric vinyl ether terminated product contain no detectable free hydroxyl groups, i.e., less than about 1% of the initial hydroxyl groups of the reactant mixture remain unreacted. It is also important that there should be essentially no free isocyanate groups remaining in the product, that is, less than about 1% of the initial isocyanate groups of the reactant mixture. In general, the ratios of polyester (a), diisocyanate (b) and monovinyl ether (c) are selected to provide an equal number of equivalents of hydroxyl and isocyanate groups.

The vinyl ether oligomers may be formed by reacting the hydroxyl-terminated polyester (a) with the isocyanate compound (b) or by reacting the isocyanate (b) with the hydroxy vinyl ether (c) and thereafter reacting the adduct with the remaining component or alternatively, the three components may be co-reacted. The ratios of (a), (b), and (c) will be chosen so that the ratio of the total number of hydroxyl groups from (a) and (c) to the number of isocyanate groups from (b) is about 1:1. The ratio of the number of hydroxyl groups from (a) to the number of hydroxyl groups from (c) should be in the range from about 0.5 to 5. The reaction may be carried out at temperatures in the range of 0° to 150° C. Solvents such as diethyl ether, methylene chloride, or toluene may be employed and later removed from the oligomers, or the components may be reacted in the absence of solvents. Divinyl ether monomers such as 1,4-cyclohexane dimethanol divinyl ether or triethylene glycol divinyl ether may also be used as solvents. Such compounds may be obtained as by-products in the preparation of hydroxy monovinyl ethers. Since they have no free hydroxyl groups they do not react with the isocyanates, but may remain with the oligomers in the formulations of coatings.

The reaction may be carried out without a catalyst, but a tin containing catalyst such as dibutyl tin dilaurate may be used.

Vinyl Ether Terminated Ester Monomers

The vinyl ether terminated ester monomers useful in preparing optical coatings are related to the urethane oligomers just described and may be mono or multi-functional. They may be prepared by reacting hydroxy vinyl ethers having the formula $$HO-Z-O-CR_4=CHR_3$$

with an activated derivative of a carboxylic acid having the formula

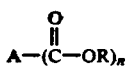

where
n is 1 to 4

A is a mono, di, tri, or tetra functional radical having a molecular weight of 15 to 180 and selected from the group consisting of alkylene, arylene, aralkylene, and cycloalkylene radicals Z is a divalent radical having a molecular weight of 25 to 500 and selected from the group consisting of alkylene or cycloalkylene radicals.

$R_3$ and $R_4$ are monovalent radicals selected from the group consisting of H and alkyl groups having 1-10 carbon atoms R is H, $-CH_3$, $-CH_2CH_3$, Cl, Br While n may be from 1 to 4, the preferred monomers will have n equal to 1 or 2. The preferred groups for A include phenyl, methyl, alkylene groups with to 4 carbon atoms, vinyl, and substituted phenylene. Examples of the ester monomers include aromatic esters such as benzoates, phthalates, isophthalates, and terephthalates and aliphatic esters such as succinates, glutarates, adipates, maleates and fumarates. In particular, the benzoates, isophthalates, succinates, and glutarates are most preferred. Specific examples of useful compounds are bis(4-vinyloxybutyl adipate), 4-vinyloxybutyl benzoate, bis(4-vinyloxybutyl) succinate, bis(4-vinyloxybutyl) maleate, bis(4-vinyloxymethyl cyclohexyl methyl) gluarate, 4-vinyloxymethyl cyclohexyl methyl acetate, 4-vinyloxymethyl cyclohexyl methyl gluarate, bis(4-vinyloxymethyl cyclohexyl methyl) maleate.

Particularly preferred embodiments of the vinyl ether terminated ester monomers will have formulas as follows.

A is a mono, di, or tri functional radical selected from the group consisting of

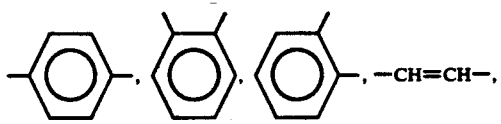

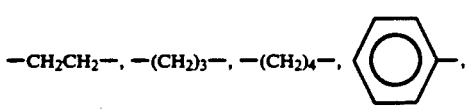

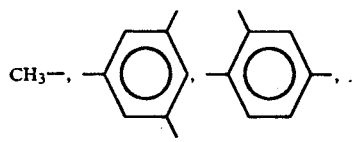

Z is a divalent radical selected from the group consisting of X is consisting of

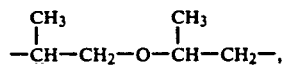

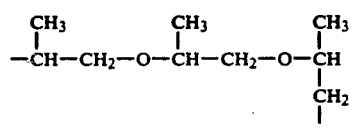

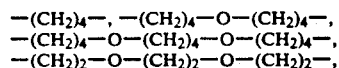
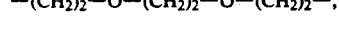

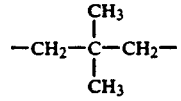

$R_3$ and $R_4$ are mono valent radicals selected from the group consisting of $-H$ and $-CH_3$.

These vinyl ether terminated esters may be prepared by various methods available to those skilled in the art and in particular, the reaction may be carried out by a transesterification reaction between the hydroxyvinyl ether and the desired methyl ester. Carboxylic acids or the corresponding acid chlorides or anhydrides also may be used.

Vinyl Ether Terminated Monomers

These vinyl ether terminated compounds are mono or multi-functional derivatives of an alcohol and may be represented by the formula $$D-(O-CR_6=CHR_5)_{n'}$$

where n' is 1 to 4, $R_5$ and $R_6$ are monovalent radicals selected from the group consisting of H and alkyl groups having 1-10 carbon atoms and D is an alkylene, cycloalkylene, or alkylene ether. Typical divinyl ether compounds of particular usefulness are 1,4-cyclohexane dimethanol divinyl ether, dipropylene glycol divinyl ether, tripropylene glycol divinyl ether, triethylene glycol divinyl ether.

Such compounds may be prepared conveniently by reacting acetylene with diols such as 1,4-cyclohexane dimethanol, dipropylene glycol, tripropylene glycol, and diethylene glycol.

Monofunctional compounds may also be used and these may be prepared by reacting acetylene with monoalcohols such as cyclohexanol, diethylene glycol monobutyl ether, ethylene glycol monohexyl ether, dipropylene glycol monomethyl ether, and ethylene glycol-2-ethyl hexyl ether.

Typical monofunctional vinyl ethers include cyclohexyl vinyl ether, n-butyldiethoxy vinyl ether, n-hexylethoxy vinyl ether, methyl dipropylene glycol vinyl ether, and 2-ethylhexylethoxy vinyl ether.

Particularly preferred embodiments of the vinyl ether terminated monomers derived from alcohols will have formulas as follows:

$R_5$ and $R_6$ are monovalent radicals selected from the group consisting of —H and —$CH_3$ and D is selected from the group consisting of

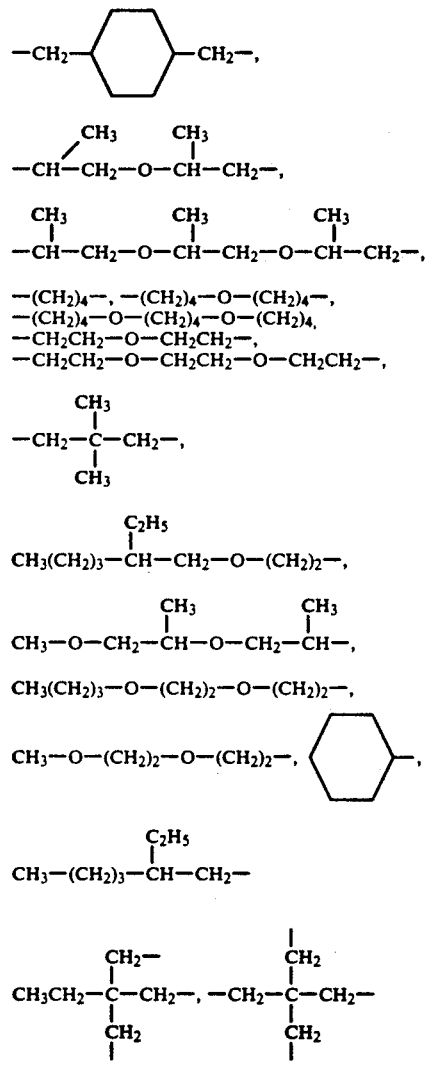

Formulation of Optical Coatings

As earlier discussed, optical coatings are usually applied in two layers, the inner being much different in physical properties than the outer. The inner or primary coating is softer and more elastic than the outer or secondary coating, which is intended to provide a tough barrier able to protect the inner coating and the glass fiber beneath it. Although the formulations used by the present inventors are selected from the same families of vinyl ether compounds, as will be seen quite different properties can be obtained. It is an advantage to the formulator so that both layers are chemically related.

In general, each layer will be comprised of a major portion of a vinyl ether terminated urethane oligomer as defined above, typically from 60 to 80% for the primary coating and 40 to 70% for the secondary coating. The vinyl ether terminated ester monomer comprises a substantial fraction of the secondary coating, say about 20 to 60%, while about 5 to 40% is used in the primary coating. The vinyl ether monomer derived from an alcohol is used in amounts of up to about 35% in the primary coating and up to about 40% in the secondary coating.

A cationic photoinitiator is used to cause the vinyl ethers to react and produce the desired coating. Typical of such photoinitiators are triarylsulfonium hexafluorophosphate salts, and diaryliodonium hexafloroantimony salts. They are usually required in amounts from about 0.1 to 5% in the blended formula of vinyl ethers.

In addition to the principal ingredients discussed above, the formulations may also contain dyes, stabilizers and hindered phenol antioxidants such as Irganox 1076, Irganox 1035 and Irganox 1010 (cinnamic acid derivatives produced by Ciba-Geigy), photosensitizers such as benzophenone, thioxanthone, and phenanthroline and other components familiar to those skilled in the art.

Curing of Optical Coatings

The vinyl ether formulations of this invention may be cured or polymerized by methods known in the art. The resins may be radiation cured, as for example by being subjected to an electron beam of an energy in the range from about 50 up to perhaps 500 KeV with a dosage from about 0.1 to about 10.0 Mrads. Electron beam curing may be performed advantageously in the presence of an iodonium or a sulfonium salt to afford high speed cationic polymerization. Ultraviolet curing in the presence of an onium salt also may be used to produce cationic polymerization. The ultraviolet radiation from a mercury vapor lamp is commonly used. Radiation activated cationic initiators have been reviewed by J. V. Crivello, *Advances in Polymer Sci*, 64, pp. 1-48 (1984). Other means include thermal curing in the presence of a Lewis acid, such as boron trifluoride, or in the presence of a strong acid such as p-toluenesulfonic acid and trifluoromethylsulfonic acid. Latent thermal catalysts which release a strong acid upon heating, e.g. blocked sulfonic acid may also be used. All these methods of polymerization are well known to those skilled in the art. Cationic polymerization in the presence of ultraviolet radiation is preferred for curing of the coatings for optical fibers.

EXAMPLE 1

A vinyl ether terminated urethane oligomer was prepared by reacting polypropylene adipate ($\overline{M}_n=500$, Witco Formrez 33-225, 1.0 hydroxy equivalent) with modified MDI (BASF MP-102, 2.0 NCO equivalents) and 4-hydroxymethyl cyclohexyl methyl vinyl ether (CHMVE) (1.0 hydroxy equivalent). The reaction was carried out in combination with 10% 1,4-cyclohexane dimethanol divinyl ether (CHVE). The product was a clear thick liquid resin.

EXAMPLE 2

A vinyl ether terminated urethane oligomer was prepared by reacting polypropylene adipate ($\overline{M}_n=2000$, Witco Formrez 33-56, 1.0 hydroxy equivalent) with TMXDI (2.0 NCO equivalents) and HBVE (1.0 hydroxy equivalents). The product was a clear thick liquid resin.

EXAMPLE 3

A fiber optic secondary coating was formulated as shown below:

| Component | Parts by Weight |
| --- | --- |
| Product from Example 1 | 55 |
| CHVE[c] | 10 |
| HBVE-isophthalate[a] | 15 |
| HBVE-succinate[b] | 20 |
| Ar$_3$SSbF$_6$ (Union Carbide UVI-6974) | 0.5 |

[a]the reaction product of isophthalic acid and 4-hydroxy butyl vinyl ether (HBVE)
[b]the reaction product of succinic acid and 4-hydroxy butyl vinyl ether (HBVE)
[c]1,4-cyclohexane dimethanol divinyl ether (CHVE)

This formulation had a viscosity of 6300 cps @ 25° C. and a refractive index of 1.51 @ 24° C. The formulation was coated on a glass plate with a 3 mil film applicator. The film was cured by exposure to a mercury arc lamp with a dose of ca. 0.5 j/cm$^2$ in a nitrogen atmosphere. The cured film was removed from the glass plate for analysis. The results are summarized in Table A below.

EXAMPLE 4

Another secondary coating was formulated as shown below.

| Component | Parts by Weight |
| --- | --- |
| Product of Example 1 | 50 |
| CHVE | 10 |
| HBVE isophthalate | 25 |
| CHMVE glutarate[a] | 15 |
| Irganox 1076[b] | 1 |
| Ar$_3$SPF$_6$ (Union Carbide UVI-6990) | 0.5 |

[a]the reaction product of 4-hydroxy methyl cyclohexyl methyl vinyl ether and glutaric acid
[b]octadecyl 3,5-di-tert-butyl-4-hydroxy hydro cinnamate This formulation has similar properties to that of Example 3, but is more stable when exposed to a temperature of 125° C. (dry) or 95% relative humidity at 95%. The improved stability is attributed to the use of the oxidation stabilizer (Irganox) and the difference in the initiator (Ar$_3$SPF$_6$), and the choice of the multifunctional monomers.

EXAMPLE 5

A fiber optic primary (inner) coating was formulated as shown below:

| Component | Parts by Weight |
| --- | --- |
| Product from Example 2 | 75 |
| HBVE-isophthalate | 5 |
| HBVE-benzoate[a] | 20 |
| Ar$_3$SSbF$_6$ (Union Carbide UVI-6974) | 1 |

[a]The reaction product of benzoic acid with 4-hydroxy butyl vinyl ether

This formulation had a viscosity of 8500 cps @ 25° C. and a refractive index of 1.49 @ 24° C. The formulation was coated on a glass plate with a 6 mil film application. The film was cured by exposure to a mercury arc lamp with a dose of ca. 05. j/cm$^2$ in a nitrogen atmosphere. The cured film was removed from the glass plate for analysis. The results are summarized in Table A below.

TABLE A

| Optical Fiber Coating Properties | | |
| --- | --- | --- |
| Property | Example 3 (outer) | Example 5 (inner) |
| Modulus @ 25° C., 50% RH (MPa) | 825 | 1.1 |
| Elongation to Break (%) | 18 | 100 |
| Elastic Modulus, E' (MPa) | | |
| @ 25° C. and 1 hertz | 1000 | — |
| @ −38° C. and 1 rad/s | — | 10 |
| Water Sensitivity (24 hr immersion) | | |
| Weight Change (%) | 2.0 | −1.3 |
| Water absorption (%) | 2.5 | 1.2 |
| Extractables (%) | 0.5 | 2.5 |
| Dose to Full Cure (J/cm$^2$) | 0.3 to 0.5 | 0.2 to 0.3 |

It can be seen that adjustment of the formulations which appear similar can actually produce quite different properties when cured. The inner coating is soft and elastic as required for such coatings and has low water absorption. The outer coating is much harder and will serve to protect the inner coating.

EXAMPLE 6

Another primary coating was formulated as shown below.

| Component | Parts by Weight |
| --- | --- |
| Product of Example 2 | 80 |
| HBVE-isophthalate | 7.5 |
| EHEVE* | 12.5 |
| Ar$_3$SSbF$_6$ (Union Carbide UVI-6974) | 1 |

*2-ethyl hexyl ethoxy vinyl ether

A very low modulus coating was produced upon curing this formulation. It illustrates the use of a monofunctional vinyl ether monomer derived from an alcohol.

We claim:
1. A composition for coating optical fiber consisting essentially of the product of reacting in the presence of an effective amount of a cationic photoinitiator
   (a) a vinyl ether urethane oligomer consisting essentially of the reaction product of (i) an hydroxyl-terminated polyester having the formula

$$HO-X(-O-\overset{O}{\underset{\|}{C}}-Y-\overset{O}{\underset{\|}{C}}-O-X)_{\overline{m}}OH$$

or an hydroxyl-terminated polyether having the formula $$HO-X-(O-X-)_{\overline{m}}-OH$$

where
X and Y are divalent radicals having a molecular weight of 28 to about 500 and selected from the group consisting of alkylene, arylene, aralkylene and cycloalkylene radicals,
m has an average value of 1 to about 100;
and (ii) a diisocyanate having the formula $$OCN-Q-NCO$$

where
Q is a divalent radical selected from the group consisting of alkylene, arylene, aralkylene, and cycloalkylene radicals, or a polyisocyanate having a functionality of 2 or more;

and (iii) a hydroxy monovinyl ether having the formula $$R_1CH=CR_2O-Z-OH$$

where

R$_1$ and R$_2$ are monovalent radicals selected from the group consisting of H and alkyl groups having 1-10 carbon atoms, Z is a divalent radical having a molecular weight of 25 to 500 and selected from the group consisting of alkylene, cycloalkylene, or alkylene ether radicals;

(b) a vinyl ether terminated ester monomer having the formula $$A+\overset{O}{\underset{\|}{C}}-O-Z-O-CR_4=CHR_3)_n$$

where n is 1 to 4

A is a mono, di, tri, or tetra functional radical having a molecular weight of 15 to 180 and selected from the group consisting of alkylene, arylene, aralkylene and cycloalkylene radicals, Z is a divalent radical having a molecular weight of 25 to 500 and selected from the group consisting of alkylene or cycloalkylene radicals, R$_3$ and R$_4$ are monovalent radicals selected from the group consisting of H and alkyl groups having 1-10 carbon atoms;

(c) a vinyl ether terminated monomer derived from an alcohol having the formula $$D-(O-CR_6=CHR_5)_{n'}$$

where n' is 1 to 4,

R$_5$ and R$_6$ are mono valent radicals selected from the group consisting of H and alkyl groups having 1 to 10 carbon atoms, and D is a mono, di, or trivalent radical consisting of alkylene, cycloalkylene, or alkylene ether having a molecular weight of 56 to 1000.

2. The composition of claim 1 wherein for the vinyl ether urethane oligomer of (a)

X is a divalent radical selected from the group consisting of

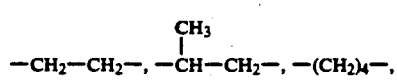

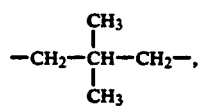

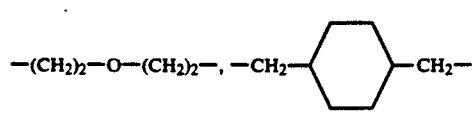

Y is a divalent radical selected from the group consisting of

—(CH$_2$)$_4$—, —(CH$_2$)$_2$—, —CH=CH—, —(CH$_2$)$_3$—,

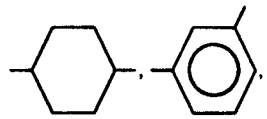

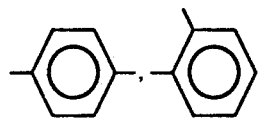

Q is a divalent radical selected from the group consisting of

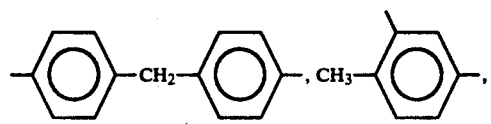

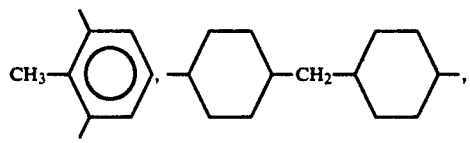

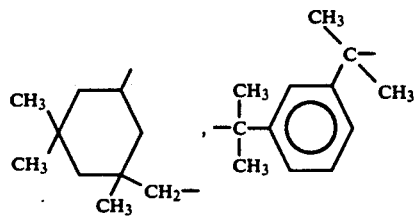

R$_1$ and R$_2$ are monovalent radicals selected from the group consisting of —H and —CH$_3$, and Z is a divalent radical selected from the group consisting of

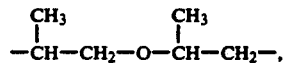

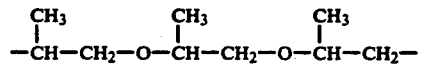

—(CH$_2$)$_4$—, —(CH$_2$)$_4$—O—(CH$_2$)$_4$—,
—(CH$_2$)$_4$—O—(CH$_2$)$_4$—O—(CH$_2$)$_4$—,
—(CH$_2$)$_2$—O—(CH$_2$)$_2$—O—(CH$_2$)$_2$—,

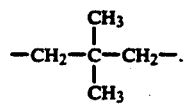

3. The composition of claim 1 wherein for the vinyl ether terminated ester monomer of (b)

A is a mono, di, or tri functional radical selected from the group consisting of

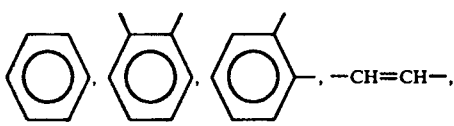

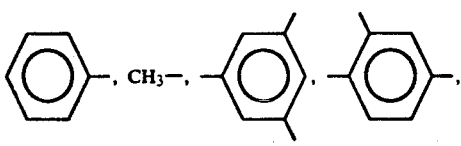

Z is a divalent radical selected from the group consisting of

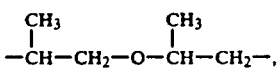

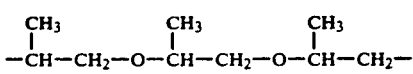

—(CH₂)₄—, —(CH₂)₄—O—(CH₂)₄—,
—(CH₂)₄—O—(CH₂)₄—O—(CH₂)₄—,
—(CH₂)₂—O—(CH₂)₂—O—(CH₂)₂—,

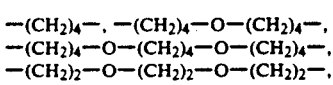

R₃ and R₄ are mono valent radicals selected from the group consisting of —H and —CH₃.

4. The composition of claim 1 wherein for the vinyl ether monomer of (c)

R₅ and R₆ are monovalent radicals selected from the group consisting of —H and —CH₃, and D is selected from the group consisting of

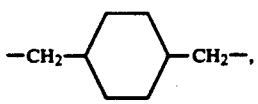

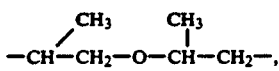

—(CH₂)₄—, —(CH₂)₄—O—(CH₂)₄—,
—(CH₂)₄—O—(CH₂)₄—O—(CH₂)₄,
—CH₂CH₂—O—CH₂CH₂—,
—CH₂CH₂—O—CH₂CH₂—O—CH₂CH₂—,

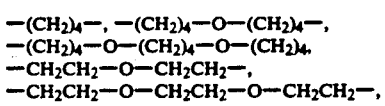

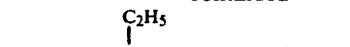

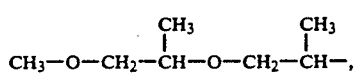

CH₃(CH₂)₃—O—(CH₂)₂—O—(CH₂)₂—,
CH₃—O—(CH₂)₂—O—(CH₂)₂—,

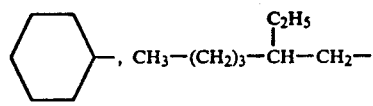

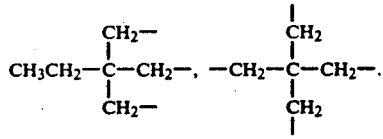

5. The composition for a primary optical fiber coating of claim 1 wherein said vinyl ether urethane oligomer of (a) is about 50 to 85 percent by weight, said vinyl ether terminated ester monomer of (b) is up to about 50 percent by weight, said vinyl ether terminated monomer derived from an alcohol of (c) is up to about 50 percent by weight, and the total of (b) and (c) is no more than 50 percent by weight and said composition further comprises about 0.1 to 5 percent by weight of a cationic photoinitiator, and optionally up to about 3% by weight of a thermal oxidation stabilizer, based on the total composition.

6. The composition for a secondary optical fiber coating of claim 1 wherein said vinyl ether urethane oligomer of (a) is about 30 to 75 percent by weight, said vinyl ether terminated ester monomer of (b) is up to about 70 percent by weight, said vinyl ether terminated monomer derived from an alcohol of (c) is up to about 70 percent by weight, the total of (b) and (c) being no more than 70 weight percent and said coating further comprises 0.1 to 5 percent by weight of a cationic photoinitiator, and optionally up to about 3% by weight of a thermal oxidation stabilizer, based on the total composition.

7. A composition for a primary optical fiber coating of claim 5 wherein said vinyl ether urethane oligomer of (a) is about 60-80 weight percent, said vinyl ether terminated ester monometer of (b) is about 5-40 weight percent, said vinyl ether terminated monomer derived from an alcohol of (c) is up to 35 weight percent and the total of(b) and(c) is no more than 40 weight percent.

8. A composition for a secondary optical fiber coating of claim 6 wherein said vinyl ether urethane oligomer of (a) is about 40-70 weight percent, said vinyl ether terminated ester monomer of (b) is 20 to 60 weight percent, said vinyl ether terminated monomer derived from an alcohol of (c) is up to about 40 weight percent, and the total of (b) and (c) is no more than 60 weight percent.

9. A composition for a primary optical fiber coating consisting essentially of (a) a vinyl ether terminated urethane oligomer prepared by reacting polypropylene adipate with tetramethyl xylene diisocyanate and 4-hydroxy butyl vinyl ether;

(b) the reaction product of isophthalic acid and 4-hydroxy butyl vinyl ether;

(c) the reaction product of benzoic acid and 4-hydroxy butyl vinyl ether (d) an effective amount of a cationic photoinitiator.

10. A composition for a primary optical fiber coating consisting essentially of
   (a) a vinyl ether terminated urethane oligomer prepared by reacting polypropylene adipate with tetramethyl xylene diisocyanate and 4-hydroxy butyl vinyl ether;
   (b) the reaction product of isophthalic acid and 4-hydroxy butyl vinyl ether;
   (c) 2-ethyl hexyl ethoxy vinyl ether;
   (d) an effective amount of a cationic photoinitiator.

11. A composition for a secondary optical fiber coating consisting essentially of
   (a) a vinyl ether terminated urethane oligomer prepared by reacting polypropylene adipate with 4,4'-diphenyl methane diisocyanate and 4-hydroxymethyl cyclohexyl methyl vinyl ether;
   (b) 1,4-cyclohexane dimethanol divinyl ether;
   (c) the reaction product of isophthalic acid and 4-hydroxy butyl vinyl ether;
   (d) the reaction product of succinic acid and 4-hydroxy butyl vinyl ether;
   (e) an effective amount of a cationic photoinitiator.

12. A composition for a secondary optical fiber coating consisting essentially of
   (a) a vinyl ether terminated urethane oligomer prepared by reacting polypropylene adipate with 4,4'-diphenylmethane diisocyanate and 4-hydroxy methyl cyclohexyl methyl vinyl ether;
   (b) 1.4-cyclohexane dimethanol divinyl ether;
   (c) the reaction product of isophthalic acid and 4-hydroxy butyl vinyl ether;
   (d) the reaction product of glutaric acid and 4-hydroxy methyl cyclohexyl methyl vinyl ether;
   (e) an effective amount of a photoinitiator.

13. An optical fiber coated with the cured composition of any one of claims 1, 2, 3 or 4.

14. An optical fiber having a primary coating with the composition of claims 5 or 7.

15. An optical fiber having a secondary coating with the composition of claims 6 or 8.

* * * * *

UNITED STATES PATENT AND TRADEMARK OFFICE
CERTIFICATE OF CORRECTION

PATENT NO. : 5,139,872
DATED : August 18, 1992
INVENTOR(S) : Lapin et al

Page 1 of 2

It is certified that error appears in the above-indentified patent and that said Letters Patent is hereby corrected as shown below:

Column 5, line 35,36: "1,5-tetrahydronaphthalene, diisocyanate" should read
--1,5-tetrahydronaphthalene diisocyanate--

Column 9, line 37: "with to 4 carbon" should read --with 1 to 4 carbon--

Column 9, line 60: "  " should read --  --

UNITED STATES PATENT AND TRADEMARK OFFICE
CERTIFICATE OF CORRECTION

PATENT NO. : 5,139,872
DATED : August 18, 1992
INVENTOR(S) : Lapin et al

It is certified that error appears in the above-indentified patent and that said Letters Patent is hereby corrected as shown below:

Column 12, line 14: "hexafloroantimony" should read --hexafluoroantimony--

Column 13, line 65: "ca. 05. j/cm²" should read --ca. 0.5 j/cm²--

Column 17, line 5: 

Column 18, line 51: "monometer" should read --monomer--

Signed and Sealed this

Fourteenth Day of September, 1993

BRUCE LEHMAN

Commissioner of Patents and Trademarks